US011846329B2

United States Patent
Kurematsu et al.

(10) Patent No.: US 11,846,329 B2
(45) Date of Patent: Dec. 19, 2023

(54) CAM CLUTCH

(71) Applicant: TSUBAKIMOTO CHAIN CO., Osaka (JP)

(72) Inventors: Yuji Kurematsu, Osaka (JP); Tsubasa Sugiya, Osaka (JP); Eiichi Nakagawa, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/118,438

(22) Filed: Mar. 7, 2023

(65) Prior Publication Data

US 2023/0296144 A1  Sep. 21, 2023

(30) Foreign Application Priority Data

Mar. 15, 2022 (JP) .................................. 2022-040022

(51) Int. Cl.
*F16D 41/069* (2006.01)
*F16D 41/04* (2006.01)

(52) U.S. Cl.
CPC ........... *F16D 41/069* (2013.01); *F16D 41/04* (2013.01)

(58) Field of Classification Search
CPC ...... F16D 41/069; F16D 41/07; F16D 41/076; F16D 41/084
See application file for complete search history.

(56) References Cited

U.S. PATENT DOCUMENTS

| 8,753,240 | B2 * | 6/2014 | Kato | B60W 20/00 |
| | | | | 475/8 |
| 9,212,707 | B2 * | 12/2015 | Kato | F16D 41/07 |
| 2014/0202821 | A1 * | 7/2014 | Schotten | F16D 41/084 |
| | | | | 192/45.1 |
| 2022/0056963 | A1 | 2/2022 | Nakagawa et al. | |

FOREIGN PATENT DOCUMENTS

JP         6882699 A    6/2021

* cited by examiner

*Primary Examiner* — Huan Le
(74) *Attorney, Agent, or Firm* — WHDA, LLP

(57) ABSTRACT

To provide a simple-structured cam clutch that does not require precise control, uses a smaller drive force, provides improved clutch operation stability and high responsiveness, and offers more mode switch options. The cam clutch includes a plurality of cams circumferentially arranged between an inner race and an outer race. The cams are arranged in a plurality of rows adjacent each other in a direction of rotation axis. The cam clutch has a selector that allows a rotation angle thereof to be controlled relative to the inner race or the outer race. The selector has a cam orientation control surface capable of changing the orientation of at least one row of cams by making contact with a cam surface. The cam orientation control surface includes a cam release portion radially protruded toward the cams more than a cam actuator portion and moving the cams to a non-operating orientation.

6 Claims, 7 Drawing Sheets

CAM CLUTCH

BACKGROUND OF THE INVENTION

1. Field of the Invention

The present invention relates to a cam clutch configured to be switchable between a free state that allows relative rotation between an outer race and an inner race and a locked state that prohibits relative rotation between the outer race and the inner race.

2. Description of the Related Art

Clutches control torque transmission and interruption by switching between a locked state that prohibits relative rotation between the inner race and the outer race (transmits torque) and a free state that allows relative rotation between the inner race and the outer race (interrupts torque). Some clutches known as cam clutches are switched between the locked state and the free state by forced change of the orientation of cams or sprags.

Japanese Patent No. 6882699, for example, discloses a cam clutch having a plurality of cams circumferentially arranged between the inner race and the outer race and a cam orientation changing part that includes a plurality of pin members as the means of forcing the cams to tilt. The pin members press one side of the cams in the circumferential direction by moving in the circumferential direction relative to the cams to forcibly change the cam orientation.

SUMMARY OF THE INVENTION

These cam clutches require a large drive force when switching from the locked state to the free state to change the orientation of cams with the engaging force of the cams still acting, and the switching may not be made smoothly during torque transmission between the inner race and outer race.

Moreover, the raceways of the inner and outer races could suffer damage, and the mechanism for changing the cam orientation and the actuator needed to be made large in accordance with the drive force.

The cam clutch known from Japanese Patent No. 6882699 is highly responsive and can provide a desired torque capacity. With the pin members located away from the pivot point of the pins, a relatively large drive force can be generated for changing the cam orientation. On the other hand, the pins need to be positioned precisely relative to each other, and also, the rotation angle of the cam orientation changing part needs to be controlled precisely when changing the orientation of the cams.

The present invention solves these problems, and it is an object of the invention to provide a simple-structured cam clutch that does not require precise control, uses a smaller drive force for forced change of cam orientation, provides improved clutch operation stability and high responsiveness, and offers more mode switch options.

The present invention achieves the above object by providing a cam clutch including: an inner race and an outer race that are coaxial and relatively rotatable; a plurality of cams circumferentially arranged between the inner race and the outer race; a cage member fixed to the outer race or the inner race not to rotate and supporting the plurality of cams; and a selector allowing a rotation angle thereof to be controlled relative to the outer race or the inner race to which the cage member is fixedly attached, the plurality of cams being arranged in a plurality of rows adjacent each other in a direction of rotation axis, the selector including a plurality of orientation changing parts each capable of changing an orientation of the plurality of rows of cams, one of the orientation changing parts corresponding to at least one row of cams having a cam orientation control surface in contact with a cam surface of the cams and capable of changing an orientation of the cams, the cam orientation control surface including a cam actuator portion causing the cams to perform an ordinary operation, and a cam release portion radially protruded toward the cams more than the cam actuator portion and moving the cams to a non-operating orientation.

According to the invention set forth in claim 1, the plurality of cams are arranged in a plurality of rows adjacent each other in the direction of rotation axis, and the selector has a plurality of orientation changing parts each capable of changing the orientation of the plurality of rows of cams. This configuration allows the orientation of cams in plural rows to be changed by rotation of a single selector, and thus enables the cam clutch to operate in plural modes by control of the rotation angle of one selector.

The cam orientation control surface can make contact with a cam surface of at least one row of cams and change the orientation of the cams, and includes a cam actuator portion, and a cam release portion radially protruded toward the cams more than the cam actuator portion and moving the cams to a non-operating orientation. The cam orientation control surface can free the cams from an operating state wherever there is the cam release portion, so that it need not be precisely positioned for each of the plurality of cams, and also the rotation angle of the selector need not be controlled precisely.

The cam clutch requires a smaller drive force for forced change of the orientation of a row of cams by the cam orientation control surface. Thus the components and actuator for the switching can be made smaller and producible more inexpensively. The smaller drive force also means improved clutch operation stability and higher responsiveness. Moreover, the durability will be improved because the raceways of the inner race and outer race suffer less damage.

The switching of the orientation of a row of cams by the cam orientation control surface is achieved by the selector riding over the end face of the cams, so that the switching angle of the selector need not be controlled precisely and can be made large, which enables reliable switching operation irrespective of various dimensional tolerances or control errors.

This means that with one row of cams released from the operating state by the cam orientation control surface, the selector can be rotated for switching the modes of another row of cams, and therefore the number of combinations of modes switchable by rotation of one selector is increased.

According to the configuration set forth in claim 2, when the first row of cams is in the locked state, the selector does not require to bear torque. Therefore the selector structure can be made simpler, which will improve the durability further.

According to the invention set forth in claim 3, the first row of cams and the second row of cams both engage with the cam orientation control surface, so that the selector does not require precise control of the rotation angle in all the modes.

According to the invention set forth in claim 4, the cam clutch can be switched from one mode to another with one selector for two independent inner races.

According to the invention set forth in claim 5, with different types of cams, the cam clutch can provide different torque transmission or response speed characteristics that optimally match the requirements for each of the modes switched by the selector.

According to the invention set forth in claim 6, the cam clutch further includes a spacer member disposed between the inner race and the outer race for at least one row of cams such as to keep a distance between an outer circumferential surface of the inner race and an inner circumferential surface of the outer race. The spacer member provides a centering function so that other bearing members can be omitted and the cam clutch can be made more compact in the axial direction. The inner race and outer race having their centers precisely matching each other can reduce variation in the operation of the plurality of cams, so that the stability of the clutch operation will improve further.

DESCRIPTION OF THE PREFERRED EMBODIMENTS

Embodiments of the present invention are described with reference to FIG. 1 to FIG. 7. Note, however, the present invention is not limited to these embodiments.

Embodiment 1

Figure 1:
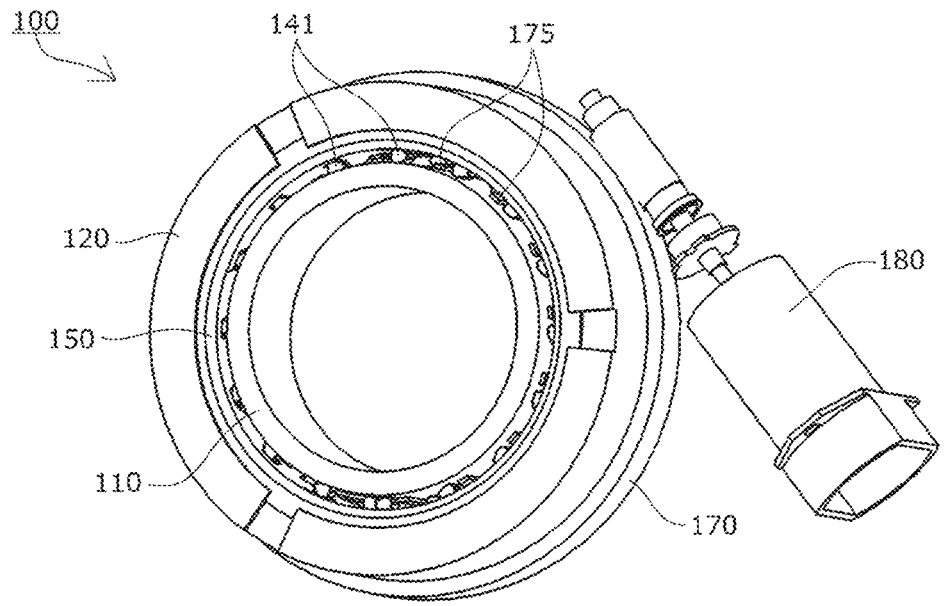
FIG. 1 is a perspective view of a cam clutch according to a first embodiment of the present invention.
Figure 2:
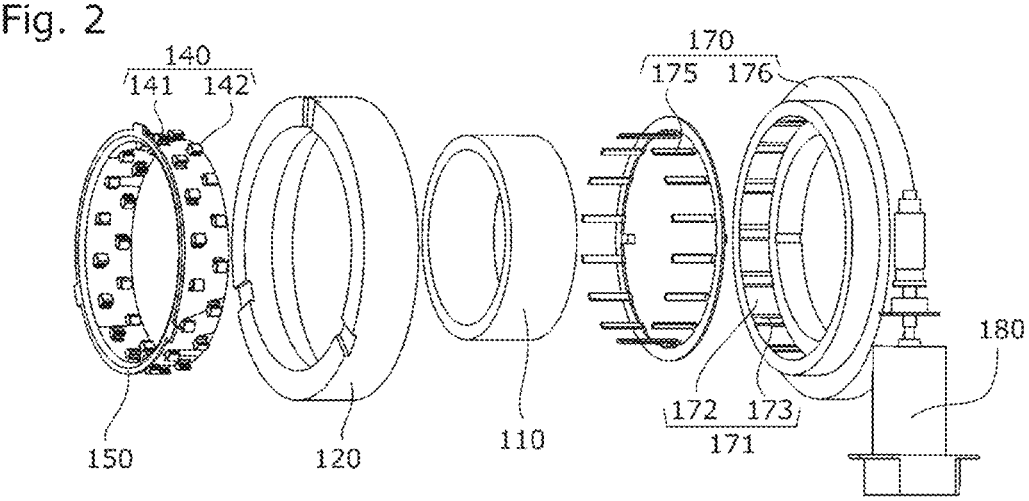
FIG. 2 is an exploded perspective view of the cam clutch shown in FIG. 1.
Figure 3:
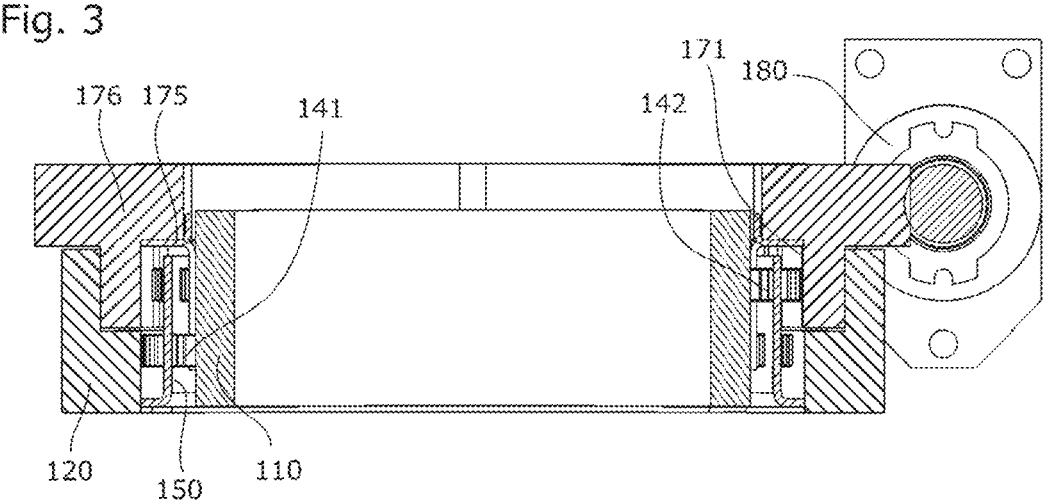
FIG. 3 is a cross-sectional view of the cam clutch shown in FIG. 1.

The cam clutch 100 according to a first embodiment of the present invention includes, as shown in FIG. 1 to FIG. 3, an inner race 110 and an outer race 120 that are coaxial and rotatable relative to each other, a plurality of cams 140 that transmit and interrupt drive force between the inner race 110 and the outer race 120, a cage member 150 that is fixed to the outer race 120 not to rotate and supports the plurality of cams 140, and a selector 170 that allows a rotation angle thereof to be controlled relative to the outer race 120.

The plurality of cams 140 are arranged in two rows, a first row of cams 141 and a second row of cams, adjacent each other in the direction of the rotation axis. The first row of cams and the second row of cams are each disposed such as to configure a one-way clutch in opposite directions.

The selector 170 includes a cam pressing part 175 that is an orientation changing part capable of changing the orientation of the first row of cams 141, and a cam orientation control surface 171 that is an orientation changing part capable of changing the orientation of the second row of cams 142.

The cam orientation control surface 171 includes a cam actuator portion 172 that causes the second row of cams 142 to perform an ordinary operation, and a cam release portion 173 that radially protrudes toward the second row of cams 142 more than the cam actuator portion 172 and moves the second row of cams 142 to a non-operating orientation.

In this embodiment, the second row of cams 142 is configured such that the cam surface on the side facing the outer race 120 makes contact only with the cam orientation control surface 171 of the selector 170, and not with the inner circumferential surface of the outer race 120. Instead, the second row of cams 142 may be configured to make contact with the inner circumferential surface of the outer race 120 in part in the direction of rotation axis.

The cam pressing part 175 includes a plurality of axially extending pin-like portions each corresponding to each of the first row of cams 141, and is configured to be able to change the orientation of the first row of cams 141 by pressing one side of the first row of cams 141 in the circumferential direction when the selector 170 is rotated.

In this embodiment, the cam pressing part 175 is formed as a separate component from a selector body 176. When in use, the cam pressing part 175 and selector body 176 rotate integrally and serve as the selector 170.

The first row of cams 141 is configured such that the cam surface facing the outer race 120 makes contact only with the outer race 120, and the cam surface facing the inner race 110 makes contact only with the inner race 110. The cam pressing part 175 pressing one side of the first row of cams 141 when the selector 170 is rotated moves the first row of cams 141 to a non-operating orientation.

The selector 170 is driven by an actuator 180 to rotate relative to the outer race 120 and configured to allow its rotation angle to be controlled relative to the outer race 120.

In this embodiment, the outer race 120 and actuator 180 are fixed to a stationary portion so that the rotation angle of the selector 170 relative to the outer race 120 is controlled by the actuator 180.

Figure 4:
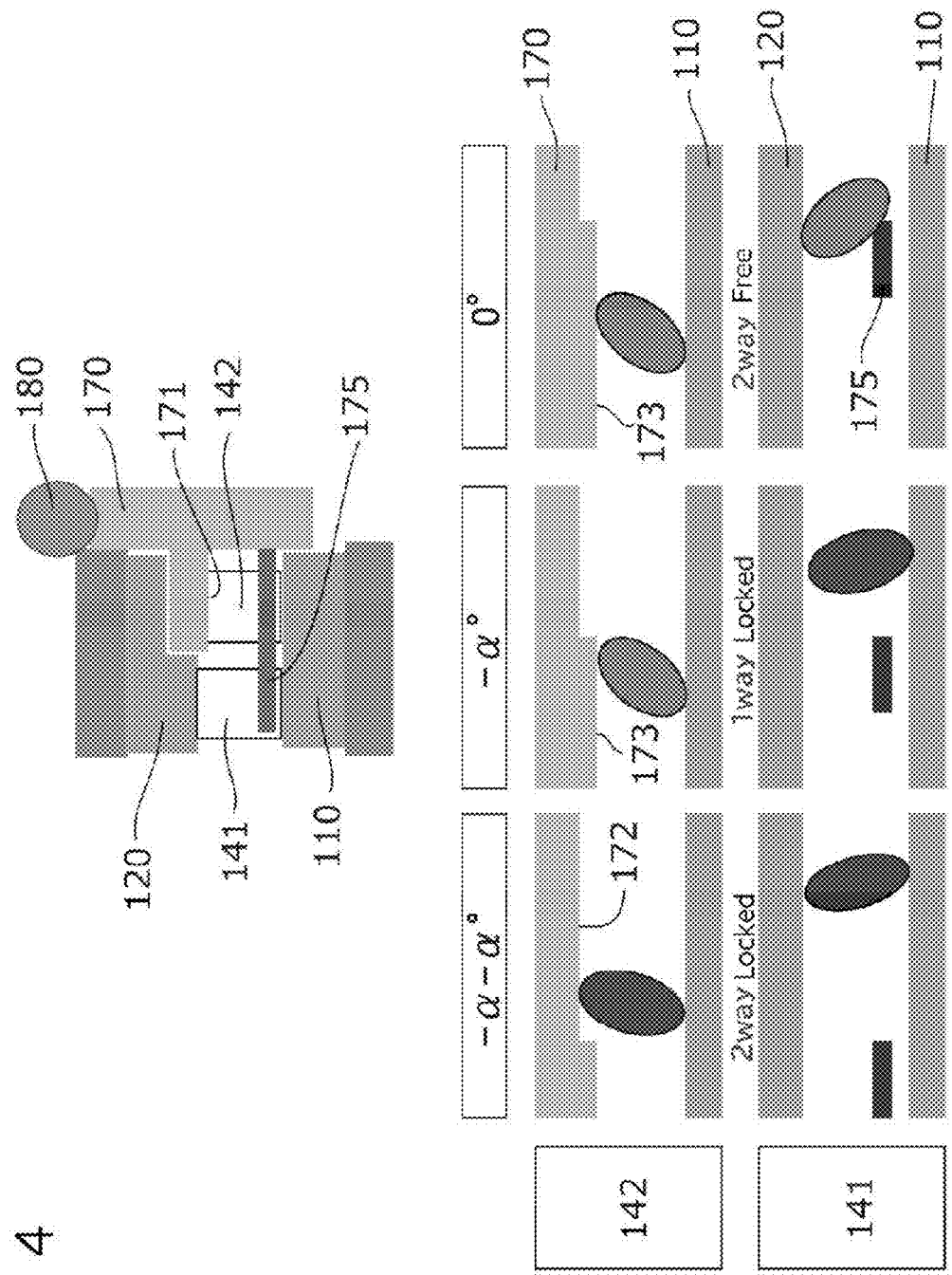
FIG. 4 is a diagram explaining the operation of the cam clutch shown in FIG. 1.

As shown in FIG. 4, the cam clutch 100 according to this embodiment is switched from one to another of a two-way free state that allows relative rotation between the inner race 110 and outer race 120 in both directions, a one-way locked state that allows rotation in one direction and prohibits rotation in the opposite direction, and a two-way locked state that prohibits rotation in both directions, by a change in the rotation angle of the selector 170.

In the two-way free state (lower right in FIG. 4, at 0°), the cam surface of the second row of cams 142 on the side facing the outer race 120 is in contact with the cam release portions 173 of the cam orientation control surface 171 of the selector 170, so that the second row of cams 142 is kept in the orientation in which the cams do not transmit torque. With the cam pressing part 175 of the selector 170 pressing the side face of the first row of cams 141 on the side closer to the inner race 110, the first row of cams 141 is kept in the orientation in which the cams do not transmit torque.

In the one-way locked state (lower middle in FIG. 4, at −α°), the cam surface of the second row of cams 142 on the side facing the outer race 120 is in contact with the cam release portions 173 of the cam orientation control surface 171 of the selector 170, so that the second row of cams 142 is kept in the orientation in which the cams do not transmit torque. The cam pressing part 175 of the selector 170 is separated from the side face of the first row of cams 141 on the side closer to the inner race 110 so that the first row of cams 141 is in the orientation in which the cams transmit torque in one direction.

In the two-way locked state (lower left in FIG. 4, at −α−α°), the cam surface of the second row of cams 142 on the side facing the outer race 120 is in contact with the cam actuator portions 172 of the cam orientation control surface 171 of the selector 170, so that the second row of cams 142 is in the orientation in which the cams transmit torque in one direction. The cam pressing part 175 of the selector 170 is separated from the side face of the first row of cams 141 on the side closer to the inner race 110 so that the first row of cams 141 is in the orientation in which the cams transmit torque in one direction.

Embodiment 2

Figure 5:
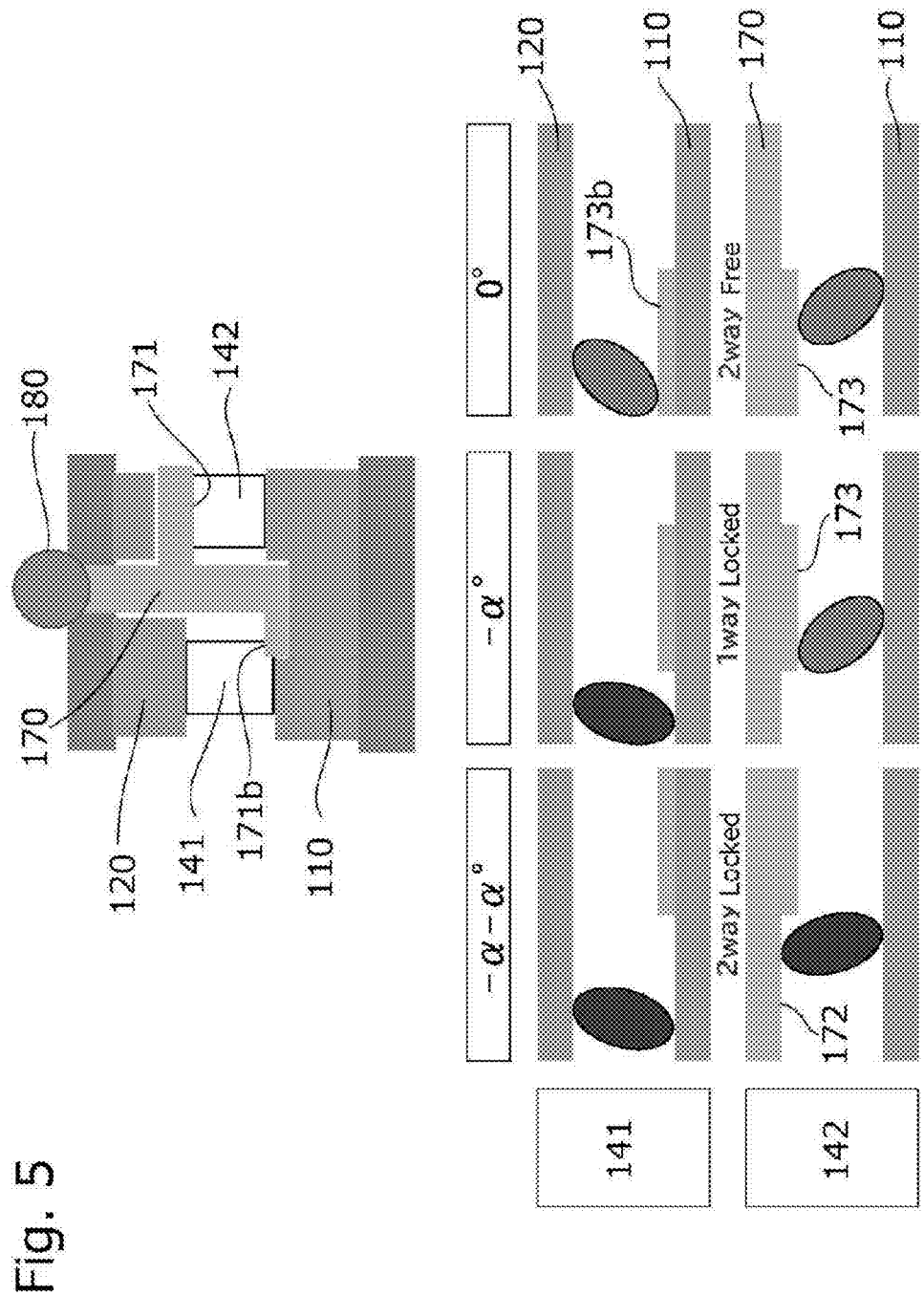
FIG. 5 is a diagram explaining the operation of the cam clutch according to a second embodiment of the present invention.

The cam clutch according to a second embodiment of the present invention is configured, as illustrated in FIG. 5, to have the first row of cams 141 and the second row of cams 142 arranged on both sides of the selector 170 such that the first row of cams 141, on their cam surface facing the inner race 110, partly makes contact with the cam orientation control surface 171b, which is an orientation changing part capable of changing the orientation of the first row of cams 141, of the selector 170.

In the two-way free state (lower right in FIG. 5, at 0°), the cam surface of the second row of cams 142 on the side facing the outer race 120 is in contact with the cam release portions 173 of the cam orientation control surface 171 of the selector 170, so that the second row of cams 142 is kept in the orientation in which the cams do not transmit torque. The cam surface of the first row of cams 141 facing the inner race 110 is partly in contact with the cam release portions 173b of the cam orientation control surface 171b of the selector 170, so that the first row of cams 141 is kept in the orientation in which the cams do not transmit torque.

In the one-way locked state (lower middle in FIG. 5, at −α°), the cam surface of the second row of cams 142 on the side facing the outer race 120 is in contact with the cam release portions 173 of the cam orientation control surface 171 of the selector 170, so that the second row of cams 142 is kept in the orientation in which the cams do not transmit torque. The cam surface of the first row of cams 141 facing the inner race 110 is separated from the cam release portions 173b of the cam orientation control surface 171b of the selector 170 to be able to contact the outer circumferential surface of the inner race 110, i.e., the first row of cams 141 is in the orientation in which the cams transmit torque in one direction.

In the two-way locked state (lower left in FIG. 5, at −α−α°), the cam surface of the second row of cams 142 on the side facing the outer race 120 is in contact with the cam actuator portions 172 of the cam orientation control surface 171 of the selector 170, so that the second row of cams 142 is in the orientation in which the cams transmit torque in one direction. The cam surface of the first row of cams 141 facing the inner race 110 is separated from the cam release portions 173b of the cam orientation control surface 171b of the selector 170 to be able to contact the outer circumferential surface of the inner race 110, i.e., the first row of cams 141 is in the orientation in which the cams transmit torque in one direction.

In this embodiment, the directions in which rotation is prohibited in the one-way locked state may be inversed by making the circumferential length of the cam release portions 173 for the second row of cams 142 shorter and making the circumferential length of the cam release portions 173b for the first row of cams 141 longer.

Embodiment 3

Figure 6:
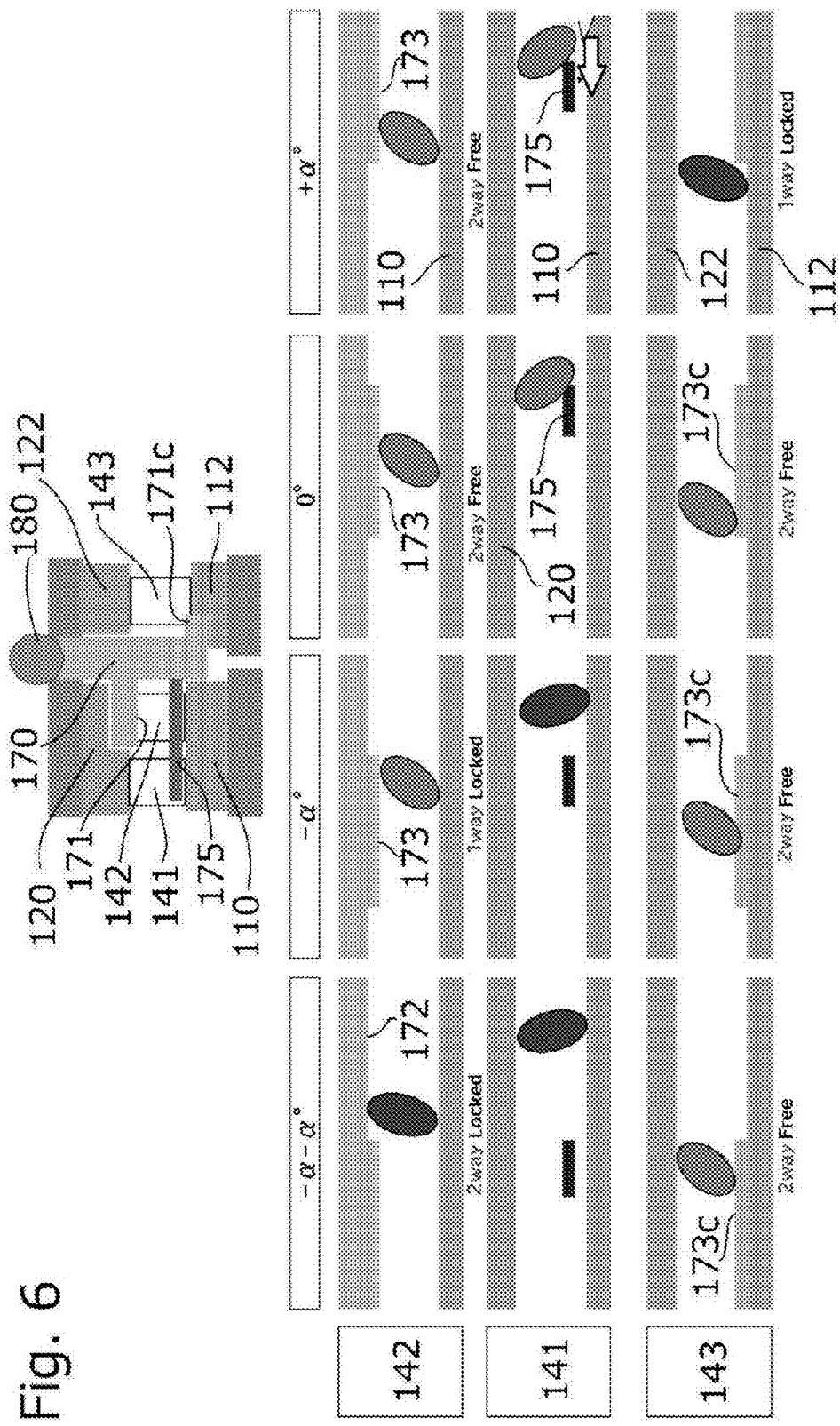
FIG. 6 is a diagram explaining the operation of the cam clutch according to a third embodiment of the present invention.

The cam clutch according to a third embodiment of the present invention is configured, as illustrated in FIG. 6, to have a second inner race 112 and a second outer race 122 on the opposite side of the selector 170 of the cam clutch 100 according to the first embodiment described above, and a third row of cams 143 disposed therebetween.

The second outer race 122 is fixed to a stationary part as with the outer race 120, while the second inner race 112 is configured to be rotatable independently of the inner race 110.

The third row of cams 143 is configured to make contact with the cam orientation control surface 171c, which is an orientation changing part of the selector 170 capable of changing the orientation of the third row of cams 143, in part on the cam surface facing the second inner race 112.

The rotation of the inner race 110 is controlled by switching the cam clutch from one to another of the two-way free state (second from lower right in FIG. 6, at 0°), one-way locked state (second from lower left in FIG. 6, at −α°), and two-way locked state (lower left in FIG. 6, at −α−α°), similarly to the first embodiment.

In these positions, the cam surface of the third row of cams 143 facing the second inner race 112 is partly in contact with the cam release portions 173c of the cam orientation control surface 171c of the selector 170, so that the third row of cams 143 is kept in the orientation in which the cams do not transmit torque, i.e., allowing free rotation of the second inner race 112 (two-way free state).

Rotating the selector 170 in the reverse direction (lower right in FIG. 6, at +α°) from the two-way free state in which both the inner race 110 and the second inner race 112 are rotatable in both directions (second from the lower right in FIG. 6, at 0°) causes the cam surface of the third row of cams 143 facing the second inner race 112 to separate from the cam release portions 173c of the cam orientation control surface 171c of the selector 170 to be able to contact the outer circumferential surface of the second inner race 112, moving the third row of cams 143 to the orientation in which the cams transmit torque in one direction.

If the pressure applied by the cam pressing part 175 to the side of the first row of cams 141 at this time is found to be more than necessary to change the orientation of the first row of cams 141, it is desirable to provide a resilient member or the like to push back the cam pressing part 175 as indicated by an arrow in FIG. 6 and prevent it from pressing the side of the first row of cams 141 more than necessary.

Embodiment 4

Figure 7:
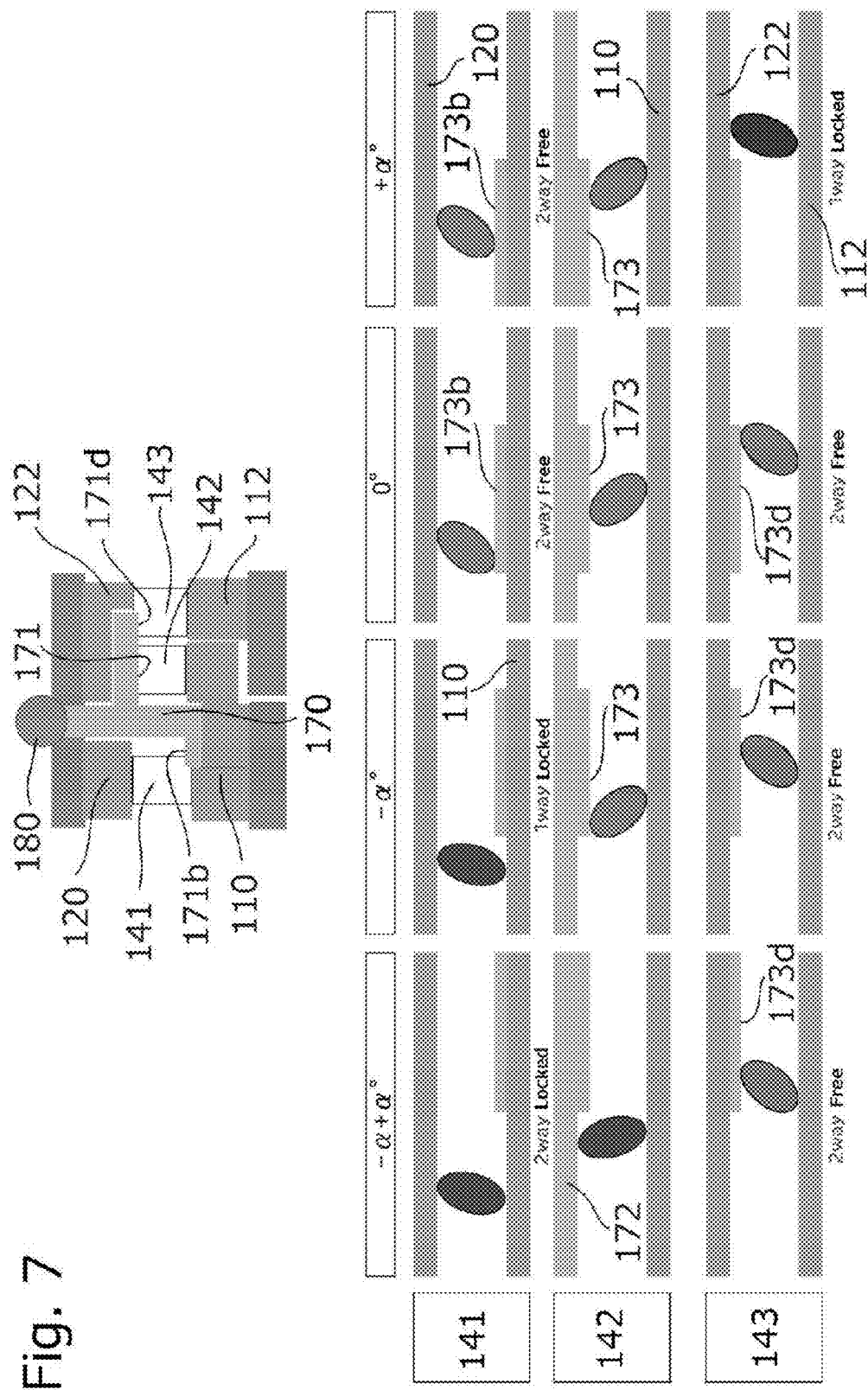
FIG. 7 is a diagram explaining the operation of the cam clutch according to a fourth embodiment of the present invention.

The cam clutch according to a fourth embodiment of the present invention is configured, as illustrated in FIG. 7, to have a second inner race 112 and a second outer race 122 on the opposite side in the direction of rotation axis of the selector 170 across from the second row of cams 142 of the cam clutch according to the second embodiment described above, and a third row of cams 143 disposed therebetween.

The second outer race 122 is fixed to a stationary part as with the outer race 120, while the second inner race 112 is configured to be rotatable independently of the inner race 110.

The third row of cams 143 is configured to make contact with the cam orientation control surface 171d, which is an orientation changing part of the selector 170 capable of changing the orientation of the third row of cams 143, in part on the cam surface facing the second outer race 122.

The rotation of the inner race 110 is controlled by switching the cam clutch from one to another of the two-way free state (second from lower right in FIG. 7, at 0°), one-way locked state (second from lower left in FIG. 7, at −α°), and two-way locked state (lower left in FIG. 7, at −α−α°), similarly to the second embodiment.

In these positions, the cam surface of the third row of cams 143 facing the second outer race 122 is partly in contact with the cam release portions 173d of the cam orientation control surface 171d of the selector 170, so that the third row of cams 143 is kept in the orientation in which the cams do not transmit torque, allowing free rotation of the second inner race 112 (two-way free state).

Rotating the selector 170 in the reverse direction (lower right in FIG. 7, at +α°) from the two-way free state in which both the inner race 110 and the second inner race 112 are rotatable in both directions (second from the lower right in FIG. 7, at 0°) causes the cam surface of the third row of cams 143 facing the second outer race 122 to separate from the cam release portions 173d of the cam orientation control surface 171d of the selector 170 to be able to contact the inner circumferential surface of the second outer race 122, moving the third row of cams 143 to the orientation in which the cams transmit torque in one direction.

While embodiments of the present invention have been described in detail, the present invention is not limited to the above-described embodiments and may be carried out with various design changes without departing from the scope of the present invention set forth in the claims.

While the actuator 180 illustrated in the embodiments described above is supposed to be a motor with a worm drive that engages with the outer periphery of the selector 170, the actuator may have any configuration as long as it drives the selector 170 to rotate relative to the outer race 120 and second outer race 122.

As with the third and fourth embodiments in which an independently rotatable second inner race is provided, there may be three or more inner races that are independently rotatable, and four or more rows of cams corresponding to the number of inner races.

Figure 8:
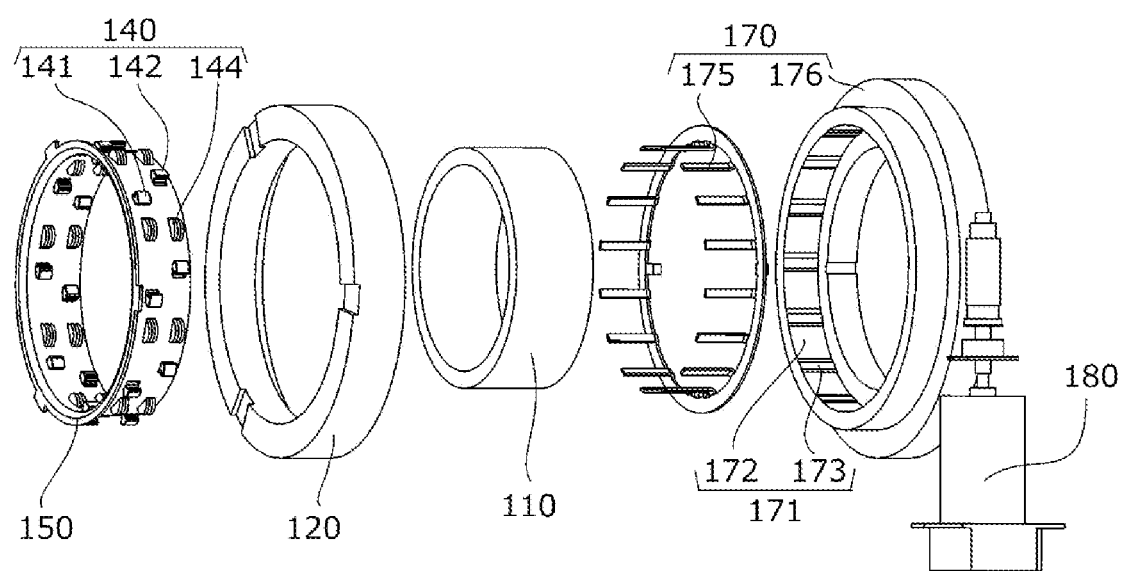
FIG. 8 is an exploded perspective view of the cam clutch according to another embodiment of the present invention.

As illustrated in FIG. 8, a plurality of rollers 144 may be disposed as spacer members between the inner race and the outer race on the same circumference as the cams. The spacer members may be block members disposed such as to make sliding contact with the outer circumferential surface of the inner race and the inner circumferential surface of the outer race. The spacer members may be fixed to the cage member 150, or may be formed integrally to the cage member 150.

The rows of cams may be designed in different shapes in accordance with required torque resistance.

The cam clutch may also be configured such that the inner race is fixed to a stationary part and the rotation angle of the selector relative to the inner race is controlled.

What is claimed is:

1. A cam clutch comprising:
an inner race and an outer race that are coaxial and relatively rotatable;
a plurality of cams circumferentially arranged between the inner race and the outer race;
a cage member fixed to the outer race or the inner race not to rotate and supporting the plurality of cams; and
a selector allowing a rotation angle thereof to be controlled relative to the outer race or the inner race to which the cage member is fixedly attached,
the plurality of cams being arranged in a plurality of rows adjacent each other in a direction of a rotation axis,
the selector including a plurality of orientation changing parts each capable of changing an orientation of the plurality of rows of cams,
one of the orientation changing parts corresponding to at least one row of cams having a cam orientation control surface in contact with a cam surface of the cams and capable of changing an orientation of the cams,
the cam orientation control surface including a cam actuator portion causing the cams to perform an ordinary operation, and a cam release portion radially protruded toward the cams more than the cam actuator portion and moving the cams to a non-operating orientation.

2. The cam clutch according to claim 1, wherein the plurality of cams include at least two rows of cams, a first row of cams and a second row of cams, adjacent each other in the direction of the rotation axis,
the first row of cams having an outer circumferential cam surface that is able to make contact only with the outer race and an inner circumferential cam surface that is able to make contact only with the inner race,
the second row of cams having an outer circumferential cam surface or an inner circumferential cam surface that is able to make contact with the cam orientation control surface of the selector,
the selector having an orientation changing part comprising a cam pressing part configured to be able to press a side of the first row of cams in a circumferential direction and change an orientation of the first row of cams.

3. The cam clutch according to claim 2, wherein the plurality of cams include at least three rows of cams, the first and second rows of cams and a third row of cams, adjacent each other in the direction of the rotation axis,
the inner race including a first inner race that is able to make contact with the first row of cams and the second row of cams, and a second inner race that is able to rotate independently of the first inner race and make contact with the third row of cams,
the third row of cams having an outer circumferential cam surface or an inner circumferential cam surface that is able to make contact with the cam orientation control surface of the selector.

4. The cam clutch according to claim 1, wherein the plurality of cams include at least two rows of cams, a first row of cams and a second row of cams, adjacent each other in the direction of the rotation axis,
the first row of cams having an outer circumferential cam surface that is able to make contact only with the outer race and an inner circumferential cam surface that is able to make contact with the cam orientation control surface of the selector,
the second row of cams having an inner circumferential cam surface that is able to make contact only with the inner race and an outer circumferential cam surface that is able to make contact with the cam orientation control surface of the selector.

5. The cam clutch according to claim 1, wherein the plurality of cams include different types of cams.

6. The cam clutch according to claim 1, further comprising a spacer member disposed between the inner race and the outer race for at least one row of cams such as to keep space between an outer circumferential surface of the inner race and an inner circumferential surface of the outer race.

* * * * *